Figure 1:
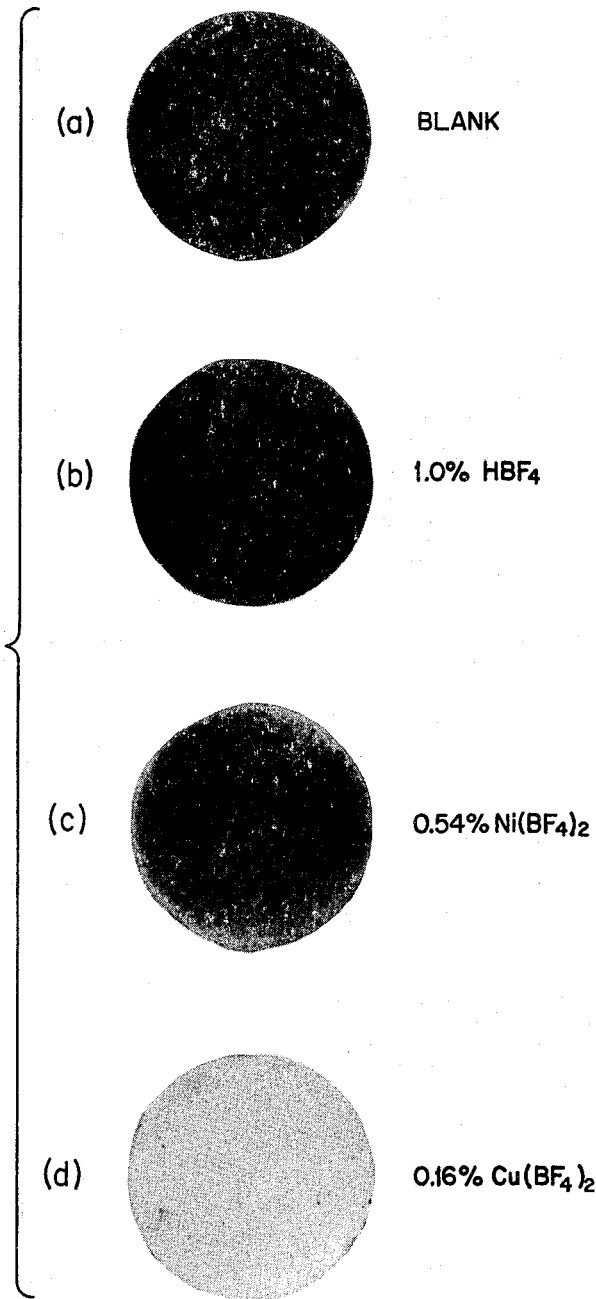

(a) BLANK
(b) 1.0% HBF$_4$
(c) 0.54% Ni(BF$_4$)$_2$
(d) 0.16% Cu(BF$_4$)$_2$ (a) BLANK
(b) EXTRACTED WITH BENZOL
(c) EXTRACTED WITH BENZOL+0.8% $Cu(BF_4)_2$ (a) BLANK
1% $Cu(BF_4)_2$

United States Patent Office 3,328,343
Patented June 27, 1967

3,328,343
COLOR STABILIZED FLUORINE POLYMERS CONTAINING COPPER FLUOBORATE
Stephen C. Dollman, Succasunna, N.J., assignor to Allied Chemical Corporation, New York, N.Y., a corporation of New York
Filed Sept. 15, 1964, Ser. No. 396,768
4 Claims. (Cl. 260—45.75)

This invention relates to production of improved fluorine-containing polymers and more particularly to improvement of the color of sintered polytetrafluoroethylene.

It is well known that fluorine-containing polymers produced under commercial operating conditions become discolored when subjected to sintering. Such discolored polymers are not acceptable for many commercial applications. Several processes have been proposed in order to improve the color of sintered fluorine-containing polymers. For example, polytetrafluoroethylene has been heated at temperatures of about 350° to 425° C. in the presence of oxygen, chlorine, bromine, nitrogen trioxide, nitrogen dioxide, nitric acid, etc. Another process has involved refluxing the polymer with a mixture of a water-soluble carboxylic acid and a water-soluble inorganic metallic oxidizing agent for one to 24 hours. The necessity for high treating temperatures in these processes creates numerous operating difficulties, making them commercially unattractive.

An object of this invention is to provide a simple and economical process for producing improved fluorine-containing polymers.

A further object of the invention is to provide a simple and economical process for producing fluorine-containing polymers which do not discolor when subjected to sintering.

Other objects and advantages of the invention will become apparent to those skilled in the art upon reading the accompanying description and disclosure.

The above objects are realized by incorporating a small quantity of copper fluoborate [$Cu(BF_4)_2$] in the fluorine-containing polymer. The copper fluoborate may be incorporated in the polymer in a variety of ways. The preferred method involves adding the copper fluoborate to an emulsion of the polymer prior to coagulation. The copper fluoborate may also be added to water used to wash the polymer produced by suspension polymerization. Another method involves adding the copper fluoborate to water and dispersing solid polymer obtained by either emulsion or suspension polymerization in the water.

Production of fluorine-containing polymers by emulsion polymerization is well known to those skilled in the art. For example, polytetrafluoroethylene can be produced by polymerizing tetrafluoroethylene in an aqueous medium in the presence of a water-soluble peroxy compound as catalyst, a saturated hydrocarbon having more than 12 carbon atoms as stabilizer and an emulsifying agent. Production of fluorine-containing polymers by suspension polymerization is also well known to those skilled in the art. For example, polytetrafluoroethylene may be prepared by polymerizing tetrafluoroethylene in an aqueous medium in the presence of a water-soluble peroxy compound as promoter, a water-soluble reducing agent as activator and a water-soluble salt of a heavy metal as accelerator.

The invention encompasses treatment of homopolymers produced from olefinic monomers containing fluorine, including tetrafluoroethylene, trifluorochloroethylene, vinylidene fluoride, trifluoroethylene, perfluoropropylene, perfluorobutadiene and other fluoropropylenes and fluorobutadienes and interpolymers produced from mixtures of the fluorine-containing olefinic monomers with one another, as well as with other olefinic monomers such as ethylene, vinyl chloride, vinylidene chloride, trichloroethylene, etc. The invention, however, is particularly applicable to treatment of homopolymers and interpolymers of tetrafluoroethylene.

Generally speaking, the amount of copper fluoborate employed constitutes about 0.1 to 1% by weight of solid polymer. In the addition of copper fluoborate to a polymer emulsion prior to coagulation, the fluoborate is preferably employed in amount of about 0.1 to 0.2% by weight of solid polymer. Where copper fluoborate is added to water employed to wash polymer produced by suspension polymerization, the fluoborate is employed in amount of about 0.2 to 0.6% by weight of solid polymer. This same quantity of fluoborate is used where the fluoborate is added to water and solid polymer is then dispersed in the water.

Use of room temperature in incorporating the copper fluoborate in the polymer is desirable, although higher temperatures, for example up to about 90° C., may be employed. It is to be clearly understood, however, that higher temperatures are neither necessary nor desirable. Agitation is required in dispersing the copper fluoborate in the polymer. Only a short contact time is necessary and may be as little as five minutes. The polymer is separated, for example, by filtering and finally dried.

The copper fluoborate-containing polymer, upon sintering, exhibits a substantially white color in contrast to a gray to black color if no copper fluoborate is added.

Since copper fluoborate is employed in low concentration, the fluoborate incorporated in the polymer does not affect the polymer properties, including stability, reactivity, etc.

The theory upon which improvement of color in the sintered polymer depends is not known. Thus, numerous related compounds have shown to have substantially no effect or even an adverse effect. For example, no effect was observed using fluoboric acid, tin fluoborate or potassium fluoborate, whereas an adverse effect was observed using ammonium fluoborate, sodium fluoborate and indium fluoborate. Only a slight improvement was observed using nickel fluoborate. It is conjectured that the copper fluoborate acts as catalyst to aid air to burn out impurities in the polymer.

The improvement of the color of sintered polytetrafluoroethylene, representative of the fluorine-containing polymers of this invention, may be illustrated by the following examples. The accompanying drawings show photographically the outstanding color improvement of sintered polytetrafluoroethylene obtained from polymers treated with copper fluoborate. The drawings also portray photographically the lack of significant color improvement of sintered polytetrafluoroethylene obtained from polymers treated with compounds related to copper fluoborate.

*Example 1*

Several batches of polytetrafluoroethylene were prepared by conventional emulsion polymerization procedure which involved polymerizing tetrafluoroethylene in an aqueous medium containing disuccinic acid peroxide as catalyst, a perfluorocyclohexyl potassium sulfate as emulsifying agent and mineral oil as stabilizer. The polymerization reaction was carried out at temperature of about 90° C. and pressure of about 400 p.s.i. for about 30 minutes. The batches of polymer were combined into a composite having a polytetrafluoroethylene solids content of 30.7%.

In a blank test 115 ml. of the composite and 585 ml. of water were placed in a vessel and stirred at a speed of about 500 r.p.m. About nine minutes stirring was required to coagulate the emulsion. The coagulated emulsion was then transferred to screens to allow drainage and dried over night at 110° C. Other tests were carried out in the same manner except that a treating agent was added to the water used to dilute the emulsion. In one test 1.0% of $HBF_4$ (by weight of solid polymer) was used. In a second test 0.54% of $Ni(BF_4)_2$ (by weight of solid polymer) was used. In a third test 0.16% of $Cu(BF_4)_2$ (by weight of solid polymer) was used.

Each sample of dry polytetrafluoroethylene was subjected to sintering by the following procedure. 25 grams of the dry polymer were cold pressed into a two inch circular disc by applying 6,000 p.s.i. pressure for three minutes. The preformed disc was then sintered for one-half hour at about 370° C. Visual color comparison of the sintered discs was made.

In the photographs shown in FIG. 1, (a) represents a disc formed from untreated polymer (blank), (b) represents a disc formed from polymer treated with the $HBF_4$, (c) represents a disc formed from polymer treated with the $Ni(BF_4)_2$ and (d) represents a disc formed from polymer treated with the $Cu(BF_4)_2$. The photographs show clearly the outstanding color improvement of sintered polytetrafluoroethylene obtained using $Cu(BF_4)_2$ as treating agent, as compared to sintered polytetrafluoroethylene obtained using $HBF_4$ and $Ni(BF_4)_2$ as treating agents.

*Example 2*

A batch of polytetrafluoroethylene was prepared by emulsion polymerization using the conventional procedure described in Example 1. The resultant emulsion had a polytetrafluoroethylene solids content of 32.0%.

In a blank test 220 ml. of the emulsion and 480 ml. of water were placed in a vessel and stirred rapidly for about seven minutes to coagulate the emulsion. The coagulated emulsion was then transferred to screens to allow dainage and dried over night at 110° C. Other tests were carried out in the same manner except that in one test the emulsion was extracted with benzol, and in a second test the emulsion was extracted with benzol and 0.8% $Cu(BF_4)_2$ (by weight of solid polymer) was added to the water used to dilute the emulsion.

Each sample of dry polytetrafluoroethylene was subjected to sintering as described in Example 1 to form a two inch circular disc. Visual color comparison of the sintered discs was made.

Figure 2:
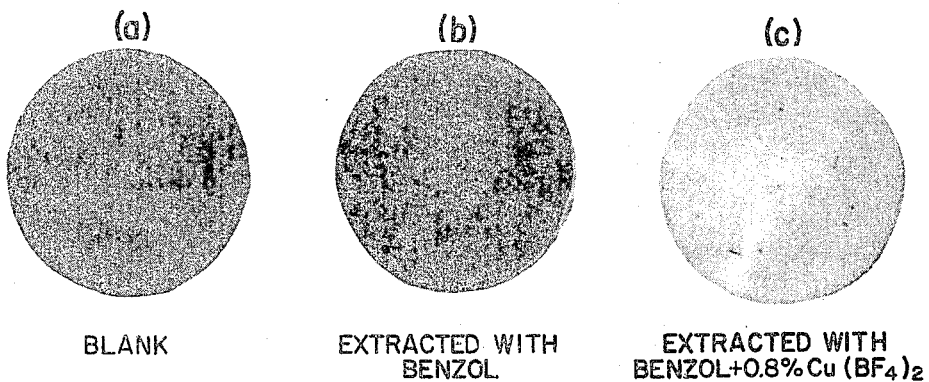

The outstanding color improvement attained using $Cu(BF_4)_2$ is shown in the photographs of FIG. 2 wherein (a) represents a disc formed from untreated polymer (blank), (b) represents a disc formed from polymer extracted with benzol, and (c) represents a disc formed from polymer extracted with benzol and then treated with the $Cu(BF_4)_2$.

*Example 3*

Two batches of polytetrafluoroethylene were prepared by conventional emulsion polymerization as described in Example 1. The batches were combined into a composite having a 28% solids content. The pH of the composite was adjusted to 7.5 with caustic soda solution.

In a blank test 125 ml. of the composite and 575 ml. of water were stirred rapidly in a vessel, coagulation occurring in about twenty minutes. The coagulated emulsion was then transferred to screens to allow drainage and dried over night at 110° C. Another test was carried out in the same manner except that 1% of $Cu(BF_4)_2$ (by weight of solid polymer) was added to the water used to dilute the emulsion.

Each sample of dry polytetrafluoroethylene was subjected to sintering as described in Example 1 to form a two inch circular disc. Visual color comparison of the sintered discs was made.

Figure 3:
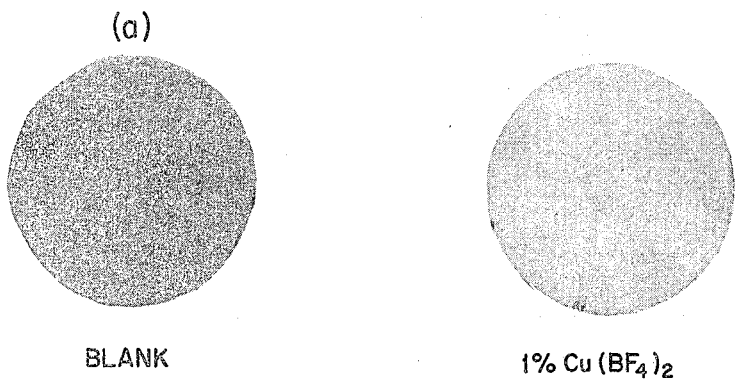

FIG. 3 shows photographs wherein (a) represents a disc formed from untreated polymer (blank), and (b) represents a disc formed from polymer treated with the $Cu(BF_4)_2$. The outstanding improvement of color resulting from use of the copper fluoborate is clearly shown on the photographs.

As indicated above, use of the process of this invention enables production of substantially white sintered fluorine-containing polymers which is required for consumer acceptance of many fabricated articles. In addition, use of the copper fluoborate enables maintenance of high dielectric values which are ordinarily lowered in the conventional sintering process.

Since various changes and modifications may be made in the invention without departing from the spirit thereof, the invention is deemed to be limited only by the scope of the appended claims.

I claim.

1. A fluorine-containing polymer in which is incorporated a stabilizing amount of copper fluoborate.

2. A fluorine-containing polymer in which is incorporated about 0.1 to 1% by weight of copper fluoborate.

3. Polytetrafluoroethylene in which is incorporated a stabilizing amount of copper fluoborate.

4. Polytetrafluoroethylene in which is incorporated about 0.1 to 1% by weight of copper fluoborate.

No references cited.

DONALD E. CZAJA, *Primary Examiner.*

LEON J. BERCOVITZ, *Examiner.*

G. W. RAUCHFUSS, *Assistant Examiner.*